United States Patent [19]
Prottey

[11] Patent Number: 5,345,217
[45] Date of Patent: Sep. 6, 1994

[54] METHOD OF DETECTING A DEFLATED TIRE ON A VEHICLE

[75] Inventor: Frederick V. Prottey, Walsall, Great Britain

[73] Assignee: Sumitomo Rubber Industries, Ltd., Hyogo

[21] Appl. No.: 876,437

[22] Filed: Apr. 30, 1992

[30] Foreign Application Priority Data

May 2, 1991 [GB] United Kingdom ............... 9109466

[51] Int. Cl.$^5$ .......................................... B60C 23/00
[52] U.S. Cl. ..................................... 340/442; 340/444; 73/146.5; 116/34 R; 200/61.22; 152/417
[58] Field of Search ................. 340/442, 444, 671; 73/146.4, 146.5; 116/34 R; 200/61.22; 152/415, 416, 417

[56] References Cited

U.S. PATENT DOCUMENTS

| | | | |
|---|---|---|---|
| 4,574,267 | 3/1986 | Jones | 340/443 |
| 4,807,468 | 2/1989 | Galan | 340/448 |
| 4,876,528 | 10/1989 | Walker et al. | 340/442 |
| 5,121,774 | 6/1992 | Hicks et al. | 340/442 |
| 5,192,929 | 3/1993 | Walker et al. | 340/442 |

FOREIGN PATENT DOCUMENTS 0291217 11/1988 European Pat. Off. .
0441599 8/1991 European Pat. Off. .

Primary Examiner—John K. Peng
Assistant Examiner—Nina Tung

[57] ABSTRACT

A method and apparatus for detecting a partially deflated tire on a vehicle having four tires each mounted on a wheel. Each wheel being provided with a signal generator for producing a series of digital signals or pulses spaced apart by equal increments by angular rotation of the respective tire and wheel assembly characterized by calculating from one of the series of signals reflective of the vehicle speed. The method includes selecting an appropriate interval for deflation detection, measuring the speed of rotation for each of the four wheels, storing the speeds found, repeating the measuring step for at least three consecutive successive equal intervals, averaging the speeds to produce an average speed signal for each wheel, processing the four signals in a processing unit which subtracts the sum of the signals from one pair of diagonally opposite wheels from the sum of the signal from the other pair of diagonally opposite wheels, sensing when the magnitude of the result is between 0.05% and 0.6% of the mean of the two sums and, if sensed within the recited range, operating a warning device to indicate that a tire is partially or completely deflated.

14 Claims, 2 Drawing Sheets

FRONT

METHOD OF DETECTING A DEFLATED TIRE ON A VEHICLE

This invention relates to a method for detecting a deflated tire on a vehicle and provides a system suitable for cars and trucks and the like.

BACKGROUND OF THE INVENTION

European Patent Publication No. 291217 describes a system primarily aimed at vehicles having electronic anti-lock braking systems although it may be used as a stand alone system.

Two versions are disclosed one of which uses a multi-pulse signal generating device means at each wheel. The other is a single-pulse per wheel revolution generator. Further details of these systems are disclosed in the publications for co-pending European Patent Applications No. 91300939.9 and 91300938.7 both dated 5th February 1991.

The multi-pulse signal based unit of the above described systems have been found to have a minimum speed above which the system operates satisfactorily of about 10 km/h when a wheel speed generator of 96 teeth is used. In the case of a 48 tooth generator the minimum speed is of the order of 18 km/h. Thus multi-pulse systems are restricted from operating satisfactorily at low speeds. By contrast a single pulse per revolution system, which is also described in the earlier applications and is based on time per revolution, has been found to operate well at low speeds but at high speeds, where the time periods to be measured are very short, it is necessary to use comparatively expensive computer systems and thus the system is not financially efficient.

SUMMARY OF THE INVENTION

An object of the present invention is to provide a deflation warning system for a tire of the above type, that overcomes the above discussed speed induced limitations by functioning over a wide effective speed range at minimum cost.

One preferred embodiment of the present invention, includes a method for detecting a partially deflated tire on a vehicle having four tires each mounted on a wheel each wheel having a signal generator for producing a series of digital signals or pulses spaced apart by equal increments of angular rotation of the respective tire and wheel assembly. The method first includes calculating vehicle speed from one of series of signals the selecting an appropriate interval for deflation detection, measuring for each of the four wheels a speed of rotation signal for said interval, storing the speed signal found, repeating the measuring for at least three consecutive equal chosen intervals, averaging the speeds to produce an average speed signal for each wheel, processing the four signals in a processing unit which subtracts the sum of the signals from one pair of diagonally opposite wheels from the sum of the signals from the other pair of diagonally opposite wheels, sensing when the magnitude of the result is between 0.05% and 0.6% of the mean of the two sums and when if sensed within the range operating a warning device to indicate a tire is partially or completely deflated.

BRIEF DESCRIPTION OF THE DRAWINGS

Further aspects of the present invention will become apparent from the following description of an embodiment of the invention by way of example and in conjunction with the attached diagrammatical drawings in which.

DESCRIPTION OF THE PREFERRED EMBODIMENT

Figure 1:
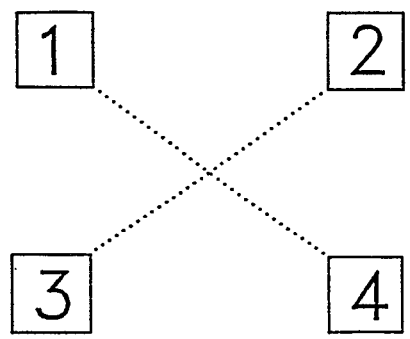
FIG. 1 is a schematic illustration of the four wheel positions on a vehicle.

FIG. 1 shows a vehicle having four wheels, the front wheels being No's 1 and 2 and the rear wheels No's 3 and 4. Each wheel is provided with a multi-tooth pulse generator of the same type as used on electronic ABS (Automatic Braking System) equipped vehicles. Suitable generators produce 96 pulses for each revolution of the wheel.

Figure 2:
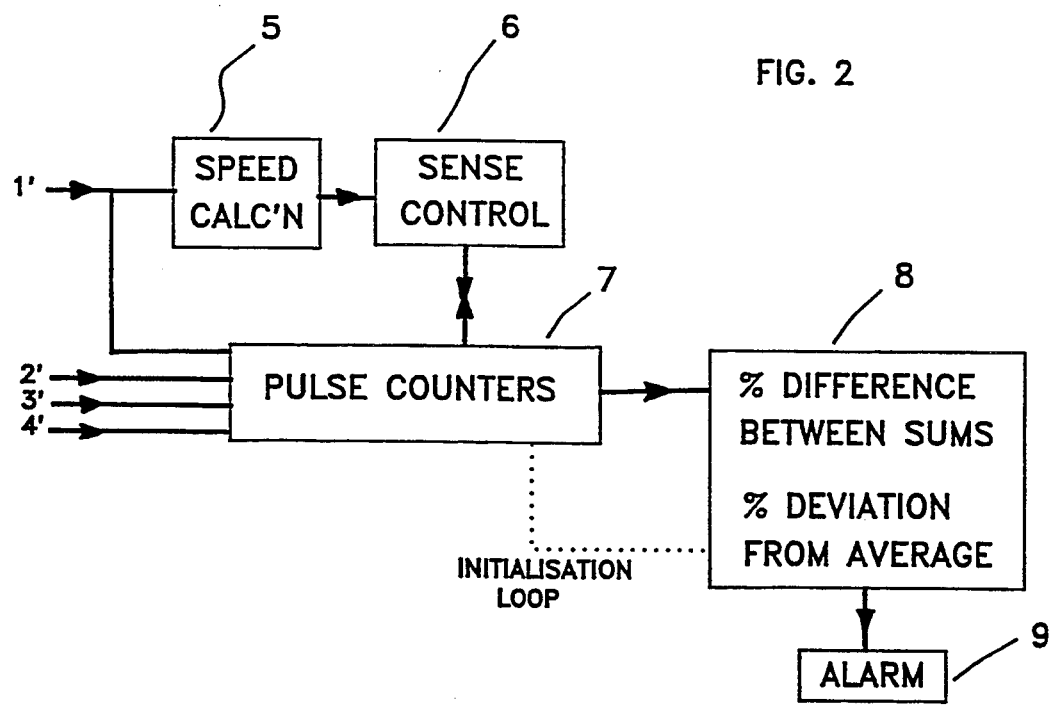
FIG. 2 is a block diagram of the calculation elements.

The four output chains of pulses 1', 2', 3', 4' are fed into a car mounted computer illustrated in FIG. 2. Firstly the output signal 1' from the front left hand wheel is fed into a speed calculating unit 5 where the speed of the vehicle is calculated. The resultant speed is then fed to a sense control unit.

The sense control unit 6 determines from a pre-mapped set of characteristics, a suitable appropriate interval for measuring the speed of the vehicle wheels and carrying out the desired deflation sensing check. In the preferred arrangement this interval is a number of pulses. For example 128 pulses is a low speed of typically 4–15 km/h, 768 pulses at 20 to 95 km/h, and 2048 pulses is 50 to 260 km/h. This gives time periods of 0.5 to 2.5 secs for sensing.

Thus having chosen the number of pulses for which measurements will be carried out the pulse counter unit 7 operates taking output signals from each wheel and processing them in timing units. Four separate timing units are provided in the pulse counting unit 7 (one of each of the speed input signals 1',2',3',4'). These log the time from each wheel. As will be appreciated the time for each wheel is directly proportional to the speed of the respective wheel, and these signals are then used to determine whether or not there is a relative deflation on one or more of the tires of the vehicle. An important feature of the present invention is that for different vehicle speeds as measured by the speed calculating unit 5 operating on the speed signal 1' from the front left hand wheel No. 1, the sense control unit 6 determines a different number of pulses within which the time will be measured for the four wheels. This allows the system to accurately sense a small change in radius caused by a small deflation of the tire (for example 0.6 bar) by choosing the number of pulses for calculating the wheel speeds.

The processing of the four speeds signals come from the pulse counter unit 7 is basically the same as that in the prior applications in that the processing unit 8 calculates factors for the lateral and longitudinal acceleration of the vehicle by comparing the angular velocity signals for the wheels on each side of the vehicle, and then compares the signals from the front and rear pair of wheels with the forward speed calculated from the mean of the angular velocities of all four wheels. The lateral and longitudinal acceleration factors, which may be accelerations or other acceleration dependent factors, are compared with a predetermined value for the vehicle concerned. If an excessive longitudinal acceleration factor is found then the deflation warning calculated is inhibited. If a lateral acceleration greater than ≈0.06 g is sensed then once again sensing of a deflation warning is inhibited. These calculation avoid false deflation warning signals due to weight transfer and tracking effects caused by a high vehicle lateral and longitudinal accelerations, because such signals cause similar changes in rolling radius to a deflation.

The system then calculates an error signal dT by comparing the times (which are proportional to the angular velocities) for the wheels according to the formula:

$$dT = \frac{2 \times (F14 - F23) \times 100}{F14 + F23}$$

where

F14=F1+F4 F23=F2+F3 and F1, F2, F3, F4 are the times for the number of wheel pulses chosen. By monitoring the dT signal, the processing unit, prepares to sense deflation if the signal is greater than 0.05% and less than 0.6%. If such a signal is found then the existence of a puncture is known and the next step is to find out which tire is punctured.

The monitoring unit 8 then calculates the difference between each wheel speed in turn and the average speed of the four wheels, and if the difference between any one wheel and the average is more than 0.1%, a second signal is generated.

If both dT and the different signals exist in the ranges mentioned, then a deflation is sensed and the wheel concerned determined. An output signal is then given to the alarm 9 which is conveniently a light on the dashboard of the vehicle to show the deflation and four other lights to show which wheel has the deflation.

As a safety guard against spurious signals the warning signal is preferable delayed until 3 or more consecutive warning results have been obtained in the processing unit 8.

To fully allow for a tire and vehicle characteristics it is necessary to trigger manually or otherwise a calibration initiating signal. This is done after changing one or more tires of the vehicle, when the vehicle is new, and, may in some circumstances, be necessary after reflation although this is not usual.

Figure 3:
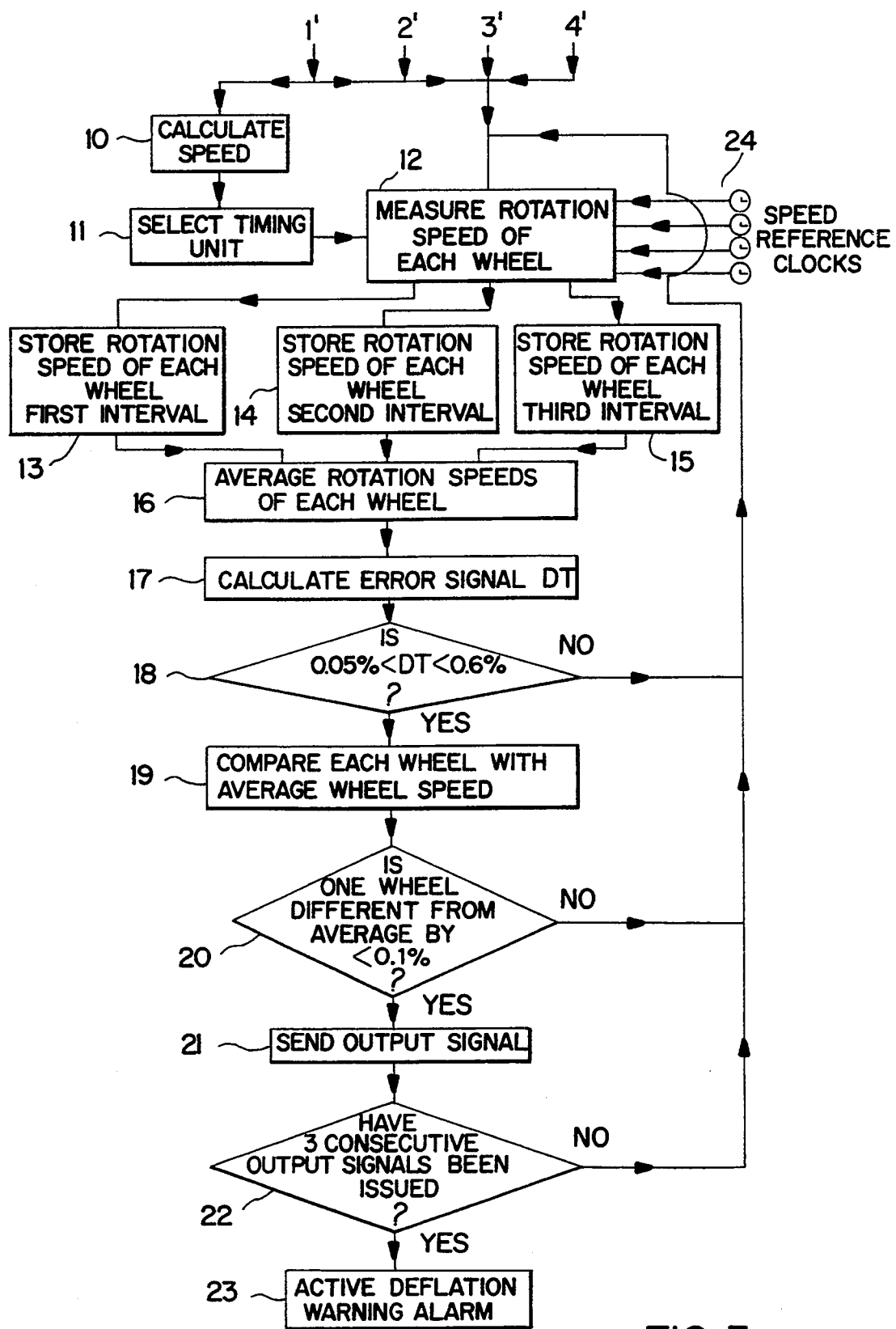
FIG. 3 is a flow chart illustrating operation of the apparatus and method

FIG. 3 represents a flow chart illustrating the steps involved in detecting a deflated tire.

In step 10, pulse 1' is sent to the speed calculation unit 5 where the speed of the vehicle calculated is determined.

In step 11, the sense control unit 6 establishes a value related to the vehicle speed calculated by the speed calculating unit 5 from the chain of pulses from one wheel (in this particular embodiment signal 1' from wheel 1). The sense control unit 6 determines these values as compared to a set of pre-mapped speed related values for which the appropriate measuring intervals for carrying out the deflation sensing check have been set. In one preferred embodiment, these appropriate measuring intervals are the number of pulses to be counted, e.g., for low speed counts 128 pulses, for any intermediate speed counts 768 and for high speed counts 2,048. Thus, the speed control unit determines the appropriate measuring interval based upon the speed of the vehicle. This measuring interval is then sent from the sense control unit 6 to the pulse counter unit 7. In step 12, the pulse counter unit 7 counts the chain of pulses 1', 2', 3' and 4' from each wheel and logs the time taken to receive the appropriate number of signals set by the sense control unit 6 from each wheel. As identified in step 24, the pulse counter unit has four separate timing units, one for each wheel. While these timing units would usually use the same clock frequency for timing, particularly in the case of a single purpose built computer, it is not necessary and different clock frequencies may be used for timing the pulses for different wheels.

As illustrated collectively in steps 13, 14 and 15, the rotation speed of each wheel in the first, second and third intervals are separately stored for determining the average rotational speed of each wheel in step 16.

Once the average rotational speed is determined, in step 17, an error signal DT is calculated. DT represents the formula discussed above.

In step 18, it is determined whether the error signal DT is within the range of between 0.05% to 0.6%.

If DT is not within the range then control is passed back to step 12. If DT is within the prescribed range, control then proceeds to step 9 for a comparison of each wheel with the average wheel speed.

In step 20, it is determined whether one wheel is different from the average by greater than 0.1%. If not, then control passes again to step 12. If the difference exceeds 0.1%, an output signal is sent in step 21.

Step 22 is determined whether three consecutive output signals have been issued. This assists in guarding against false deflation signals or signals which occur falsely as a result of normal use of the tire. If the system detects three consecutive output signals, then the deflation warning alarm is signaled.

As an alternative to the time measuring system which operates as described above the system may select from the calculated vehicle speed a suitable time interval and then for each of the four wheels count the number of pulses and process these and signals in the same way.

Having now described my invention what I claim is:

1. A method of detecting a partially deflated tire on a vehicle having four tires each mounted on a wheel, each wheel having a signal generator for producing a series of digital signals or pulses spaced apart by equal increments from angular rotation of the respective tire and wheel assembly, the steps comprising:
  calculating vehicle speed from one of the series of signals or pulses produced by the signal generator for a reference tire selected from among the four tires;
  selecting an appropriate interval for deflation detection from the calculated vehicle speed;
  measuring a speed of rotation signal for each of the four wheels during said interval;
  storing the measured speeds;
  repeating the measuring step for at least three consecutive successive equal intervals and storing the results of each repetition;
  averaging the stored speeds to produce an average speed signal for each wheel;
  processing the four signals in a processing unit which subtracts the sum of the signals from one pair of diagonally opposite wheels from the sum of the signals from the other pair of diagonally opposite wheels;
  sensing when the magnitude of the result of said processing steps is in the range of between 0.05% and 0.6% of the mean of the two sums; and
  when the mean of the sums in within the prescribed range, operating a warning device to indicate that a tire is partially or completely deflated.

2. A method according to claim 1 wherein the interval includes a number of signals representing the speed of rotation for each of the four wheels.

3. A method according to claim 1 wherein the interval includes a number of pulses representing the speed of rotation for each of the four wheels.

4. A method according to claim 1 wherein following said selecting step, the times for each of the four wheels begin at the first pulse thereafter for each respective wheel.

5. A method according to claim 1 said processing step also includes determining the speed of rotation for each of the four wheels and the average speed of all four tires; and
in said sensing step sensing when the speed of any one tire differs from the average speed by more than 0.1% and if sensed signaling a deflation.

6. A method according to claim 1 wherein the times used in said calculating step are measured against a separate clock frequency for each wheel.

7. A method according to claim 1 wherein in the processing step, signaling a deflation signal only after sensing at least two successive deflating signals.

8. A method according to claim 1, wherein in said processing step the processing unit has a processing time in the range of between 0.5 to 2.5 seconds.

9. An apparatus for detecting a partially deflated tire on a vehicle having four tires each mounted on a wheel, each wheel having a signal generator for producing a series of digital signals or pulses spaced apart by equal increments from angular rotation of the respective tire and wheel assembly, the apparatus comprising:
means for calculating vehicle speed from one of the series of signals produced by the signal generator for a reference tire selected from among the four tires;
means for selecting an appropriate interval for deflation detection from the calculated vehicle speed;
means for measuring a signal representing the rotational speed for each of the four wheels during said interval;
means for storing the measured speeds;
means for averaging the stored speeds to produce an average speed signal for each wheel;
means for processing the four signals which subtracts the sum of the signals from one pair of diagonally opposite wheels from the sum of the signals from the other pair of diagonally opposite wheels;
means for sensing when the magnitude of the result produced by said processing means is in the range of between 0.05% and 0.6% of the mean of the two sums for signaling that a tire is partially or completely deflated when the mean of the sums is within the prescribed range.

10. An apparatus according to claim 9, wherein said means for selecting produces an interval representing the rotational speed of each of the four wheels by the number of digital signals.

11. An apparatus according to claim 9 wherein said means for selecting produces an interval with a unit of time representing the rotational speed of each of the four wheels by the number of pulses.

12. An apparatus according to claim 9 wherein said processing means also determines the speed of rotation for each of the four wheels and the average speed of all four tires; and said sensing means senses whether the speed of any one tire differs from the average speed, as determined by said processing means, by more than 0.1% and, if sensed, signals a deflation.

13. An apparatus according to claim 9 wherein the times used by said calculating means are measured against a separate clock frequency for each wheel.

14. An apparatus according to claim 9 wherein said processing unit includes means for signaling a deflation signal only after sensing at least two successive deflating signals.

* * * * *